United States Patent [19]

Chen et al.

[11] Patent Number: 5,745,602

[45] Date of Patent: Apr. 28, 1998

[54] AUTOMATIC METHOD OF SELECTING MULTI-WORD KEY PHRASES FROM A DOCUMENT

[75] Inventors: Francine R. Chen, Menlo Park; Steven B. Putz, Santa Clara; Daniel C. Brotsky, Berkeley, all of Calif.

[73] Assignee: Xerox Corporation, Stamford, Conn.

[21] Appl. No.: 432,383

[22] Filed: May 1, 1995

[51] Int. Cl.$^6$ ........................................ G06K 9/72
[52] U.S. Cl. .............................. 382/229; 382/177
[58] Field of Search ........................... 382/229, 292, 382/177; 364/419.19, 419.1; 707/531, 539

[56] References Cited

U.S. PATENT DOCUMENTS

| | | | |
|---|---|---|---|
| 4,812,966 | 3/1989 | Takagi et al. | 364/419.13 |
| 5,251,316 | 10/1993 | Anick et al. | 364/419.19 |
| 5,307,266 | 4/1994 | Hayashi et al. | 364/419.17 |
| 5,440,481 | 8/1995 | Kostoff et al. | 364/419.08 |
| 5,526,443 | 6/1996 | Nakayama | 382/229 |
| 5,553,283 | 9/1996 | Kaplan et al. | 364/419.1 |

FOREIGN PATENT DOCUMENTS

| | | |
|---|---|---|
| 0 361 464 A3 | 4/1990 | European Pat. Off. . |
| 2257266 | 10/1990 | Japan . |
| 3105566 | 5/1991 | Japan . |
| 327870 | 12/1991 | Japan . |
| 6035961 | 2/1994 | Japan . |

OTHER PUBLICATIONS

European Search Report for Corresponding Application No. 96303094.5

Luhn, H.P. The Automatic Creation of Literature Abstracts, IBM Journal of Research and Development, vol. 2(2); pp. 159–162; 1958.

Salton, G. "Term–Phrase Formation" In:Harrison, Michael A. ed., Automatic Text Processing. Addison–Wesley Publishing Company, Inc.; 1989: pp. 294–299.

Carroll, J.M., Roeloffs, R., "Computer Selection of Keywords Using Word–Frequency Analysis", American Documentation, vol. 20, No. 3, pp. 183, 227–233, 1969.

*Primary Examiner*—Yon J. Couso
*Attorney, Agent, or Firm*—Tracy L. Hurt

[57] ABSTRACT

An automatic method of generating key phrases for a machine readable document. The method begins by breaking the text of the document into multi-word phrases free of stop words which begin and end acceptably. Afterward, the most frequent phrases are selected as key word phrases.

4 Claims, 5 Drawing Sheets

5,745,602

AUTOMATIC METHOD OF SELECTING MULTI-WORD KEY PHRASES FROM A DOCUMENT

FIELD OF THE INVENTION

The present invention relates to a method of automatic text processing. In particular, the present method relates to an automatic method of selecting key phrases from a machine readable document.

BACKGROUND OF THE INVENTION

A key word list allows a reader to determine the content of a document without reading that document. A key word list for a document can be created subsequent to document creation either automatically or using human intelligence and labor. Using human labor to generate a key word list can be expensive. In contrast, automatic techniques of generating a key word list can be less expensive.

Both natural language processing and statistical techniques have been used to automatically generate key word lists for documents. Natural language processing attempts to understand natural language text and is therefore computationally intensive. Statistical techniques allow quicker generation of key word lists because no effort is made to understand the text. In 1969 Carroll and Roeloffs disclosed a method for selecting key words in "Computer Selection of Keywords Using Word-Frequency Analysis." Carroll and Roelofts selected key words based upon the relative frequency of words within each document as well as across a document corpus. Because of the use of word frequency across a document corpus, the method of Carroll and Roeloffs is not fast enough without preprocessing for those searchers who desire immediate results or do not possess a corpus of related documents.

SUMMARY OF THE INVENTION

An object of the present invention is to provide an automatic method of key phrase selection that can be executed quickly to produce reasonable key phrases.

Another object of the present invention is to provide an automatic method of key phrase selection that depends neither upon natural language processing, nor upon corpus-dependent information.

An automatic method of generating key phrases for a machine readable document will be described. The method begins by generating from the document text multi-word candidate phrases. Candidate phrases are phrases free of stop words that begin and end acceptably. Afterward, the most frequent candidate phrases are selected as key word phrases.

Other objects, features, and advantages of the present invention will be apparent from the accompanying drawings and detailed description that follows.

BRIEF DESCRIPTION OF THE DRAWINGS

The present invention is illustrated by way of example and not by way of limitation in the figures of the accompanying drawings. In the accompanying drawings similar references indicate similar elements.

DETAILED DESCRIPTION OF THE PREFERRED EMBODIMENTS

Figure 1:
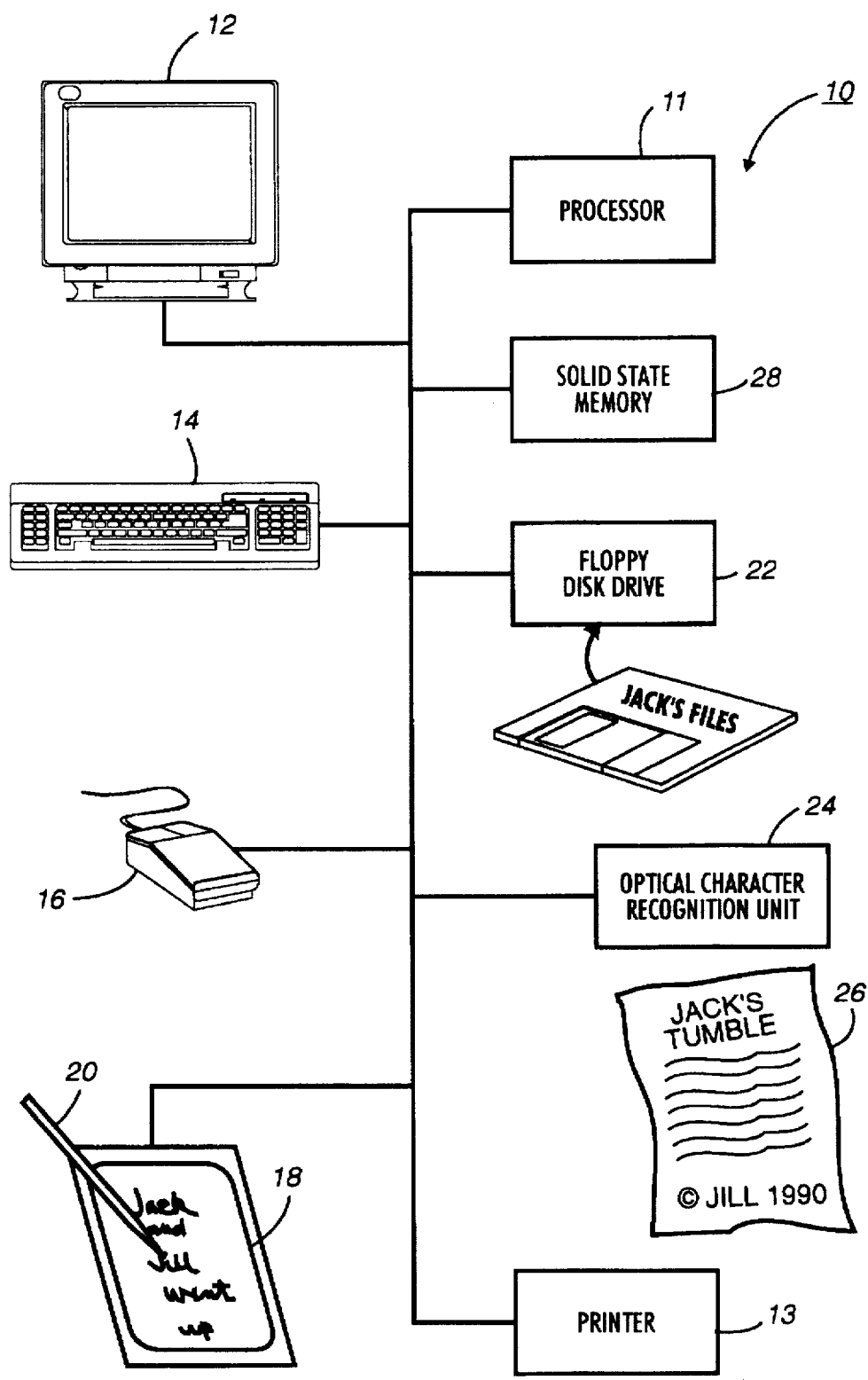
FIG. 1 illustrates a computer system which automatically selects key phrases from a machine readable document.

FIG. 1 illustrates in block diagram form computer system 10 in which the present method is implemented. The present method alters the operation of computer system 10, allowing it to select key phrases from any document presented in machine readable form. Briefly described, computer system 10 selects key phrases by breaking the text of the machine readable document into multi-word candidate phrases. Candidate phrases do not include stop words and begin and end with acceptable words. Finally, the most frequent candidate phrases are selected as key phrases. Two methods of selecting key phrases using computer system 10 will be described in detail below.

A. Key Phrase Selection Computer System

Prior to a more detailed discussion of the present method, consider computer system 10. Computer system 10 includes monitor 12 for visually displaying information to a computer user. Computer system 10 also outputs information to the computer user via printer 13. Computer system 10 provides the computer user multiple avenues to input data. Keyboard 14 allows the computer user to input data to computer system 10 by typing. By moving mouse 16 the computer user is able to move a pointer displayed on monitor 12 and to select displayed icons. The computer user may also input information to computer system 10 by writing on tablet 18 with a stylus or pen 20. Alternately, the computer user can input data stored in machine readable form on a magnetic medium, such as a floppy disk, by inserting the disk into floppy disk drive 22. Optical character recognition unit (OCR unit) 24 permits the computer user to input hardcopy documents 26 into computer system, which OCR unit 24 then converts into a coded electronic representation, typically American National Standard Code for Information Interchange (ASCII).

Processor 11 controls and coordinates the operations of computer system 10 to execute the commands of the computer user. Processor 11 determines and takes the appropriate action in response to each user command by executing instructions stored electronically in memory. Typically, operating instructions for processor 11 are stored in solid state memory 28, allowing frequent and rapid access to the instructions. Semiconductor memory devices that can be used to realize memory 28 include read only memories (ROM), random access memories (RAM), dynamic random access memories (DRAM), programmable read only memories (PROM), erasable programmable read only memories (EPROM), and electrically erasable programmable read only memories (EEPROM), such as flash memories.

B. One Method of Selecting Key Phrases

Figure 2:
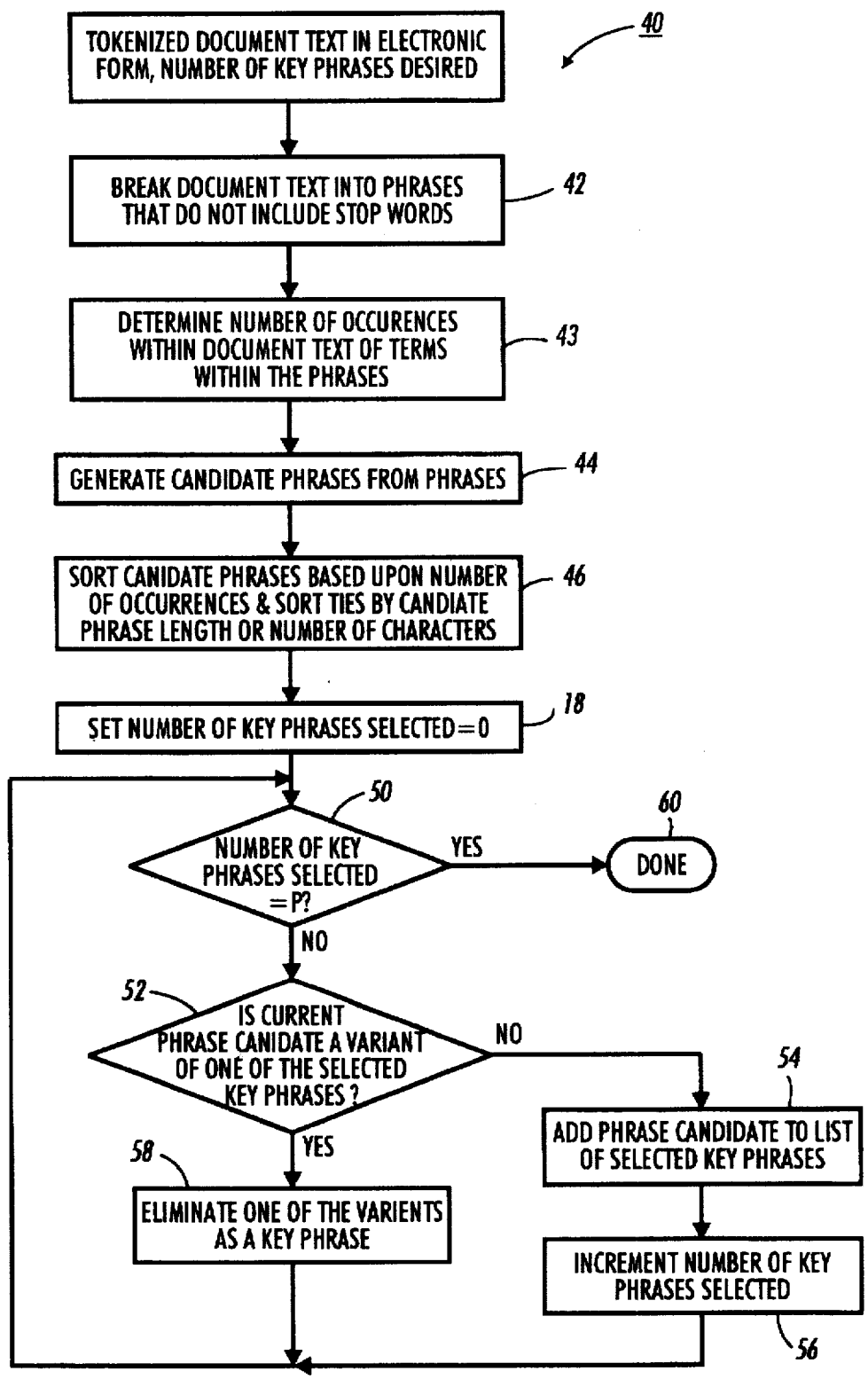
FIG. 2 is a flow diagram of the method of selecting key phrases from a machine readable document.

FIG. 2 illustrates in flow diagram form the instructions 40 executed by processor 11 to select key phrases from a machine readable document. Instructions 40 may be stored in solid state memory 28 or on a floppy disk placed within floppy disk drive 22. Instructions 40 may be realized in any computer language, including LISP and C++. Execution of instructions 40 is initiated by selection and input of a machine readable document. If desired, prior to initiating execution of instructions 40 the computer user may also change the number of key phrases selected, denoted "P," from the default number. The default number may be set to any arbitrary value. In one embodiment, the default value is set to five key phrases.

Processor 11 responds to the selection of a tokenized document by branching to step 42. As used herein, a tokenized document is one for which sentence boundaries and word tokens have identified. During step 42 processor 11 examines the tokenized document and generates multi-word phrases. That is to say, processor 11 extracts from each sentence non-overlapping phrases of two or more words. Stop words are preferably excluded from the phrases generated during step 42 so that each word of a phrase conveys meaning relevant to the document theme. Stop words are words such as pronouns, prepositions, determiners, and "to be" verbs that convey little meaning relevant to document theme. Excluding stop words from phrases has the advantage of producing compact key phrases and reducing the processing time required during steps subsequent to step 42. Processor 11 excludes stop words by comparing each word token of each sentence to the words of a stop list. Processor 11 ends one phrase and begins another whenever it encounters a stop word in a sentence. Consequently, the phrases generated are composed of adjacent terms. As a result of efforts during step 42 a list of phrases is generated. The phrase list complete, processor 11 branches to step 43 from step 42.

During step 43 processor 11 determines for subsequent use the frequency within the document of each word on the phrase list. Depending upon the tokenizer used during step 42, processor 11 may be able to determine the frequency of each word on the phrase list by consulting a term list, which lists each word of the document and identifies each sentence in which that word occurs. With such a list, processor 11 need only count the number of sentence IDs for each word on the phrase list. Afterward, processor 11 branches from step 43 to step 44.

During step 44 processor 11 generates candidate phrases from the phrases on the phrase list. Processor 11 considers a number of factors while generating candidate phrases. Processor 11 examines the beginning and ending words of a phrase to determine whether they are appropriate for a candidate phrase. This insures that the key phrases selected subsequently will appear reasonable. How processor 11 performs these tasks will be discussed in greater detail later with respect to FIG. 3. During step 44 processor 11 also examines each word of a phrase to determine whether that word is frequent. The frequency of words within phrases and of the frequency of the phrases themselves are used to select key words for a document because of the belief that the most frequent phrases are most likely to be indicative of document content. Processor 11 considers a word frequent if it occurs in the document at least a minimum number of times. That is to say, processor 11 compares the number of occurrences of a word within the document to a threshold. If number of occurrences exceeds the threshold, processor 11 considers the term frequent. Infrequent terms are excluded from candidate phrases. For brief documents the threshold is preferably set to one. As a result, only terms occurring at least twice are considered frequent. For longer documents, a higher threshold may be desirable. Armed with a list of candidate phrases, processor 11 branches from step 44 to step 46.

With step 46, processor 11 begins the task of selecting P key phrases from the list of candidate phrases. Processor 11 starts by sorting the candidate phrase list according to the number of occurrences within the document of each candidate phrase. Candidate phrases which occur frequently are placed higher on the sorted list of candidate phrases than candidate phrases that occur less frequently. Ties between candidate phrases can be sorted in a number of fashions, including by candidate phrase length measured in terms of number of words or characters, according to which phrase candidate includes the most frequent word, or in terms of highest average word frequency. As a result of step 46 processor 11 possesses an ordered list of candidate phrases. Afterward, processor 11 branches to step 48 from step 46.

During step 48 processor 11 prepares to begin selecting key phrases from the candidate phrase list by setting the number of key phrases selected to zero. That done, processor 11 branches to step 50. Processor 11 determines during step 50 whether P key phrases have been selected yet. All key phrases have not yet been selected if the number selected does not equal P. Processor 11 responds to this situation by branching to step 52 from step 50.

Processor 11 examines the candidate phrase on the top of the sorted candidate phrase list during step 52. For brevity, call that phrase the "current phrase". Processor 11 determines in step 52 whether the current phrase is a variant of one of the already selected key phrases. As used herein, a variant is a phrase that is related to another phrase, but differing in word order, or word stem. For example, possible variants of "text analysis system" include "system analyzes text," "document analysis system," and "document processing system." A number of automatic text processing techniques can be used to perform variant analysis; therefore, variant analysis will not be discussed in detail herein.

Based upon the variant analysis, processor 11 takes one of two paths from step 52. If the candidate phrase at the top of the sorted candidate phrase list is not a variant of one of the key phrases, processor 11 branches to step 54 from step 52. During step 54 processor 11 removes the current candidate phrase from the sorted candidate phrase list and places the current candidate phrase on the key phrase list. Afterward, processor 11 advances to step 56 from step 54 and increments by one the number of key phrases selected. That done, processor 11 returns to step 50.

The actions of processor 11 differ when the variant analysis of step 52 indicates that the current candidate phrase is a variant of one of the key phrases. In response, processor 11 branches to step 58 from step 52. During step 58 processor 11 removes the current candidate phrase from the sorted candidate phrase list and then modifies the key phrase list, if appropriate. In one embodiment the phrase already on the key phrase list will be removed and replaced if it is a subphrase of the phrase just selected from the sorted candidate phrase list. Thus, for example, processor 11 would exclude the subphrase "Southern California" rather than "Southern California coast." Other methods of determining which variant to exclude can be used during step 58, such as excluding the least frequent variant of a phrase. Afterward, processor 11 returns to step 50 from step 58.

Upon return to step 50, processor 11 determines whether P key phrases have been selected. If not, processor 11 branches through steps 52, 54, 56, and 58 until P key phrases have been selected from the sorted candidate phrase list. When that occurs, processor 11 branches from step 50 to step 60, selection of key phrases for the document complete.

B1. Generation of Candidate Phrases

Figure 3:
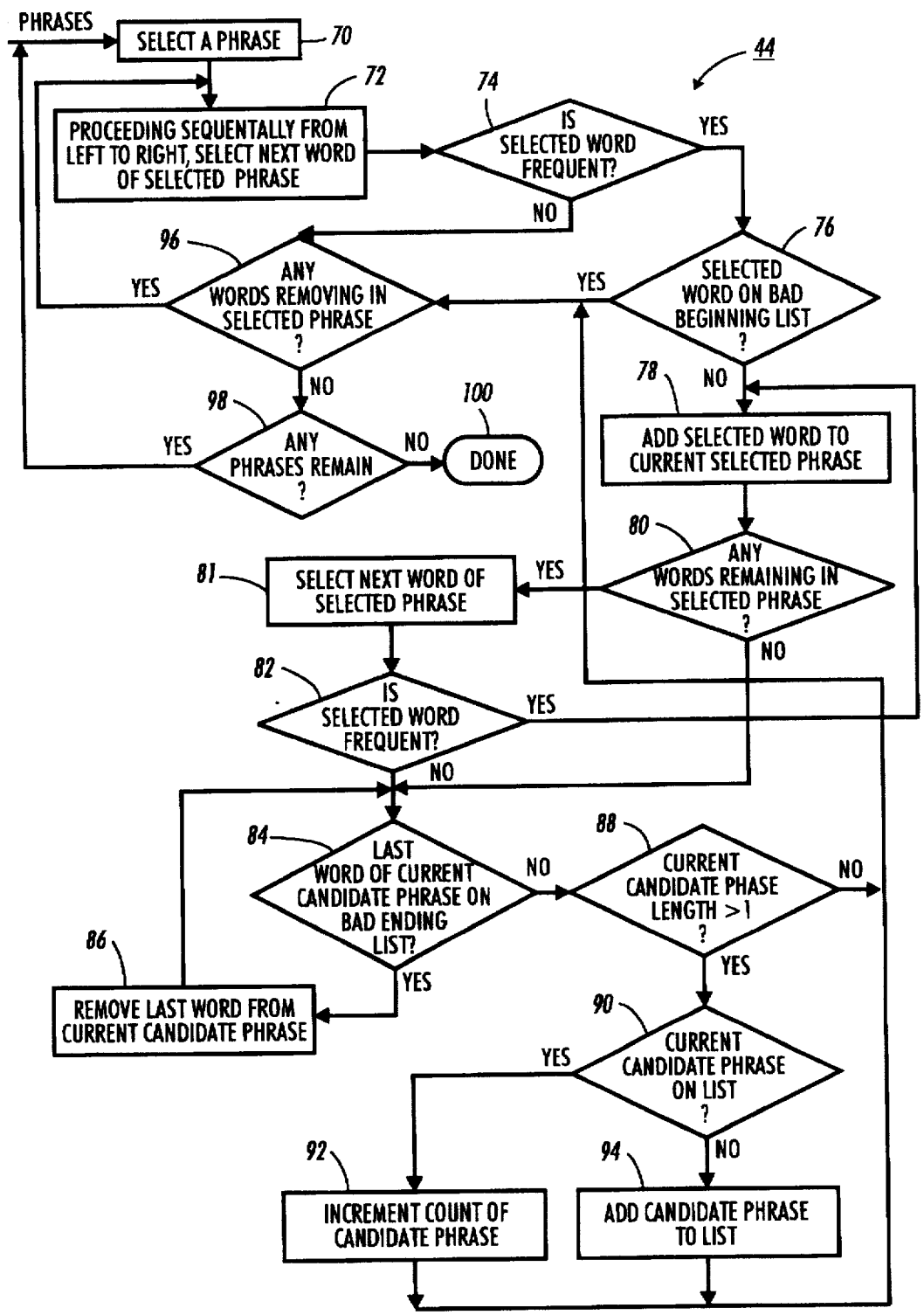
FIG. 3 is a flow diagram of the method of generating candidate phrases from phrases.

FIG. 3 illustrates in detail the activities of step 44 to break phrases into candidate phrases that are maximally long and begin and end acceptably. Briefly described, processor 11 begins by examining each word of the selected phrase a word at a time to determine whether that word is frequent. Because the candidate phrases generated during step 44 are composed entirely of adjacent and frequent terms, one phrase may generate multiple candidate phrases or none, depending upon the length of the phrase and the location of infrequent terms within the phrase. Once the first frequent word of the selected phrase is identified, processor 11 determines whether that word represents an acceptable beginning for a candidate phrase. After identifying an acceptable beginning word for a candidate phrase, processor 11 continues building the candidate phrase from frequent terms of the selected phrase until the last word of the candidate phrase is identified. Processor 11 then examines the last word of the candidate phrase to determine whether it represents an acceptable ending for a candidate phrase. If not, processor 11 removes words from the end of the candidate phrase until an acceptable ending word is discovered. Processor 11 then determines whether the resulting candidate phrase is of sufficient length. Processor 11 stores the candidate phrase if it includes a sufficient number of words.

Given that introduction, consider now a situation that aids the detailed discussion of instructions 44. First, assume the list of phrases generated during step 42 includes: "Southern Pacific Company exerted great influence," "four years later," and "fee versus free." Second, assume also that the words occurring more than once within the document include: "Southern," "Pacific," "Company," "great," "influence," "years," "later," "versus" and "free." Third, assume that the bad beginning list includes: "versus." Fourth and finally, assume that the bad ending list includes: "versus" and "later."

Generation of candidate phrases begins in step 70 with the selection of one of the phrases from the phrase list. Assume that processor 11 selects "Southern Pacific Company exerted great influence" the first pass through step 70. Afterward, processor 11 branches from step 70 to step 72.

During step 72 processor 11 selects for examination one of the words of the selected phrase. Preferably, examination of the words of the selected phrase proceeds sequentially from left to right. The selected phrase may also be examined by proceeding sequentially from right to left provided that instructions 44 are modified to check for an acceptable ending prior to checking for an acceptable beginning. Regardless of the direction processor 11 proceeds in its examination of the words of the selected phrase, the words must be examined sequentially to insure that each candidate phrase generated is composed of adjacent terms. Processor 11 preferably selects "Southern" in its first pass through step 72. Having selected a word from the selected phrase, processor 11 branches from step 72 to step 74.

Processor 11 determines during step 74 whether the selected word is frequent. Processor 11 does so by comparing the number of occurrences of the selected word to a threshold. The value of the threshold is a design choice dependent upon the length of the document for which the key phrases are being generated. In one embodiment, the threshold is set to one so that each word must occur at least twice to be considered frequent.

As a result of step 74, phrases are broken into maximally long, non-overlapping subphrases. Thus, for example, the phrase "New Mexican border" produces only the candidate phrase "New Mexican border," not the subphrases "New Mexican" and "Mexican border." Using only maximally long candidate phrases may produce spurious candidate phrases; however, these candidate phrases are unlikely to be selected as key phrases because of their low frequency of occurrence. In contrast, subphrases generated from maximally long candidate phrases are not likely to be excluded as key phrases because they are likely to occur more frequently because of their smaller number of words. Consequently, producing reasonable key phrases using subphrases of maximally long candidate phrases requires modifying the present method.

Because "Southern" is a frequent word given our assumptions, processor 11 responds by branching to step 76 from step 74. Processor 11 enters step 76 when a potential beginning word of a candidate phrase has been identified. Processor 11 determines during step 76 whether the selected word represents an acceptable beginning for a candidate phrase. Processor 11 does so by searching a bad beginning list for the selected word. The bad beginning list includes words that are not acceptable beginnings for a key phrase. The bad beginning list for English language text is likely to be brief; however, the tendency is to include a word on the bad beginning list when in doubt to reduce the possibility of generating key phrases that appear spurious or unreasonable. For non-English documents, different words should be included on the bad beginning list. For example, the French equivalent for "of," "de," should not be included on the stop word list because French noun phrases are of the form "noun de adjective." To prevent generating key phrases beginning "de adjective," "de" should be included on a French bad beginning list.

The word "Southern" constitutes an acceptable beginning for a key phrase given our assumptions, therefore processor 11 branches from step 76 to step 78.

Processor 11 begins the process of building a new candidate phrase during step 78, which shall be referred to as the current candidate phrase. During step 78 processor 11 adds the selected word to the current candidate phrase. That done, processor 11 begins the effort to add adjacent, frequent terms from the selected phrase to the current phrase candidate by advancing to step 80 from step 78. Processor 11 determines during step 80 whether the selected phrase includes any additional terms that have yet to be examined. Processor 11 has not yet examined all the words of the selected phrase and so branches to step 81 from step 80. During step 81 processor 11 selects the next word of the selected phrase for possible inclusion in the current phrase candidate. Given the selected phrase and proceeding from left to right sequentially, processor 11 selects "Pacific" during step 81. Subsequently, during step 82, processor 11 decides that the selected word is frequent. In response, processor 11 returns to step 78 from step 82. Processor 11 adds "Pacific" to the current phrase candidate during step 78, which becomes "Southern Pacific" as a result. That done, processor 11 advances to step 80 and discovers that the selected phrase includes words that have yet to be examined.

Processor 11 selects "Company" during step 81 and advances to step 82. Processor 11 discovers that the selected word is frequent because it occurs more than once in the document. Consequently, processor 11 branches to step 78 from step 82 and adds the selected word to the current candidate phrase. As a result, the current phrase candidate becomes "Southern Pacific Company." Afterward processor 11 branches to step 80 from step 78.

During step 80 processor 11 discovers that the selected phrase includes words that have not been examined yet. Accordingly, during step 81 processor 11 selects the next word of the selected phrase, "exerted." Processor 11 discovers during the subsequent step that "exerted" is not a frequent word within the selected document. The occurrence of an infrequent word adjacent to the right-most word of the current phrase candidate ends it. As a result, processor 11 will not add the selected word, nor any others, to the current phrase candidate. Processor 11 responds to this situation by branching to step 84 from step 82.

During step 84 processor 11 determines whether the last word of the current candidate phrase is an acceptable ending by searching for that word on the bad ending list. Words on the bad ending list are those that may cause a key phrase to appear spurious or unreasonable. As with the bad beginning list, words placed on the bad ending list may vary depending upon the language of the natural language text being analyzed. Given our previous assumptions, "Company" represents an acceptable ending. Having generated a candidate phrase composed entirely of adjacent, frequent terms and that ends and begins acceptably, processor 11 advances to step 88 from step 84.

Processor 11 determines during step 88 whether the current candidate phrase includes more than one word. Single word phrases are not selected as key phrases according to the present method because without linguistic information about the word it is likely to appear spurious on a key phrase list. Rather than taking the time to obtain such linguistic information, single word phrases are not accepted as phrase candidates. Because the current candidate phrase includes more than one word, processor 11 advances to step 90 from step 88.

Processor 11 compares the current candidate phrase to the phrase candidates listed to date during step 90. As the current candidate phrase is the first one generated, the first pass through step 90 processor 11 finds that the current candidate phrase is not on the list of candidate phrases. In response, processor 11 adds the current candidate phrase to the list of candidate phrases during step 94 and sets to one the count for that candidate phrase. Later processor 11 uses the counts associated with candidate phrases to select key phrases. Afterward, processor 11 branches to step 96 from step 94 to begin construction of another candidate phrase.

Efforts to construct another candidate phrase begin with step 96 by determining whether all words of the selected phrase have been examined. The words "great influence" of the selected phrase have not yet been examined, so processor 11 responds by returning to step 72 from step 96 to continue its examination of the selected phrase. Processor 11 selects "great" as the selected word during step 72. Afterward, processor 11 branches through steps 74, 76, 78, 80, 81, 82, 84, and 88 in the manner just described and builds another candidate phrase, "great influence" from the selected phrase. Eventually processor 11 branches to step 90 from step 88. If the current candidate phrase is already included on the list of candidate phrases processor 11 branches to step 92 from step 90. During step 92 processor 11 increments by one the count of the current candidate count. That done, processor 11 branches from step 92 to step 96.

Upon return to step 96 processor 11 discovers that all words of the selected phrase have been examined. Consequently, processor 11 advances to step 70 from step 96. During step 96 processor 11 selects "four years later" as the selected phrase. Subsequently, during step 72 processor 11 designates "four" as the selected word. Processor 11 discovers during step 74 that "four" is not a frequent word within the selected document. In response, processor 11 advances to step 96 from step 74. During step 96 processor 11 determines that the selected phrase includes words that have not yet been examined. Processor 11 returns to step 72 from step 96 to select the next word of the selected phrase. Processor 11 selects "years" as the selected word and determines that the selected word is frequent. Consequently, processor 11 advances to step 76. During step 76 processor 11 searches the bad beginning list for "years" and does not find it. Thus, "years" represents an acceptable beginning.

Processor 11 continues building of the current candidate phrase by branching to step 78 from step 76. The selected word is added to the current candidate phrase during step 78. In the following step, step 80, processor 11 determines whether the selected phrase includes any other words that have not yet been examined. The selected phrase does, so during step 81 processor 11 designates "later" as the selected word. Processor 11 then discovers during step 82 that "later" is a frequent word within the selected document. Processor 11 responds by branching to step 78 and adding the selected word to the current candidate phrase. As a result of this action, the current candidate phrase becomes "years later." Afterward, processor 11 branches from step 78 to step 80.

During step 80 processor 11 determines whether additional words can be added to the current candidate phrase by determining whether the selected phrase includes any additional words. Processor 11 has examined all words of the selected phrase so there will be no further additions to the current candidate phrase. Processor 11 responds by advancing to step 84 from step 80. During step 84 processor 11 determines whether the current candidate phrases ends acceptably by searching the bad ending list for "later." Processor 11 responds to the discovery of "later" on the bad ending list by branching from step 84 to step 86. During that step processor 11 removes from the current candidate phrase the last word, making the current candidate phrase "years." Afterward, processor 11 returns to step 84 from step 86 to examine once again the last word of the current candidate phrase. Processor 11 does not find "years" on the bad ending list and responds by branching to step 88 from step 86. During step 88 processor 11 determines whether the current candidate phrase is a multi-word phrase. The current candidate phrase includes only one word, so processor 11 discards the current candidate phrase and branches up to step 96 from step 88.

Processor 11 discovers during step 96 that it must select another phrase for examination because all words of the currently selected phrase have already been examined. As a result, processor 11 advances to step 98 and discovers that there are additional phrases that it has not examined yet. Processor 11 returns to step 70 and selects the phrase "fee versus free." Subsequently, processor 11 selects "fee" for examination and branches from step 72 to step 74.

Processor 11 discovers during step 74 that "fee" is an infrequent word. In response, processor 11 returns to step 72 and selects the next word of the selected phrase, "versus." Processor 11 regards "versus" as a frequent word because it appears more than once within the selected document. Accordingly, processor 11 branches to step 76 from step 74. Processor 11 searches the bad beginning list during step 76 for the selected word and discovers it there. In response, processor 11 branches from step 76 to step 96. Not all words of the selected phrase have been examined yet so processor 11 returns to step 72 from step 96. Processor 11 selects another word during step 72 and advances to step 74. Processor 11 determines that the selected word, "free," is a frequent term within the selected document during step 74. Further, during the following step processor 11 determines that the selected word is an acceptable beginning. In response, processor 11 branches to step 78 and executes steps 78, 80, 84, 88, 96, and 98 in the manner previously described. Processor 11 continues executing instructions 44 until it is discovered during step 98 that all phrases have been examined.

When that occurs, processor 11 branches to step 100 from step 98, having completed the task of generating phrase candidates.

C. Alternate Method of Selecting Key Phrases

Figure 4:
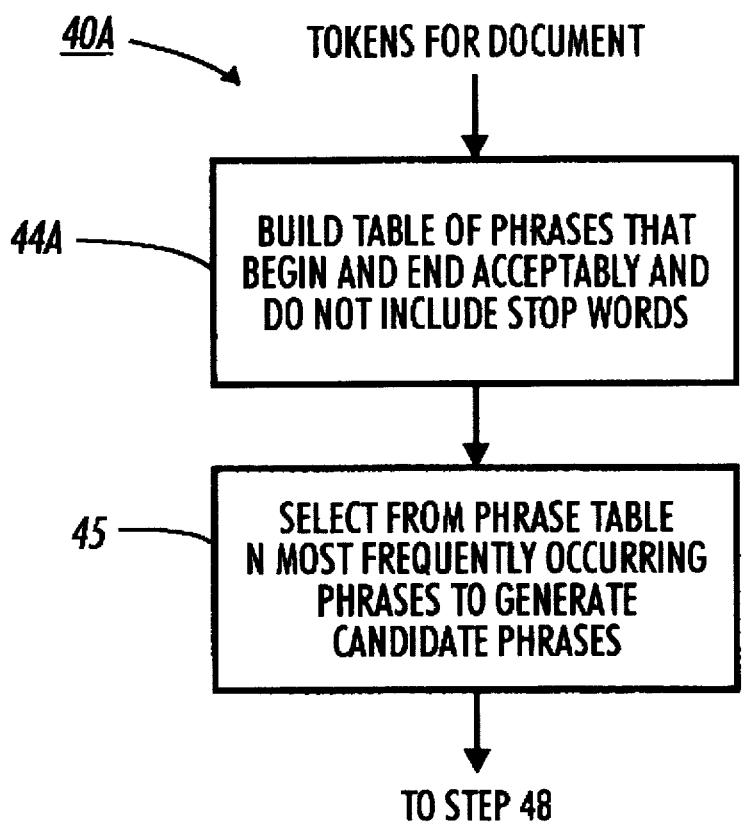
FIG. 4 illustrates in flow diagram form an alternate method of selecting key phrases.

FIG. 4 illustrates in flow diagram form alternate instructions 40a for selecting key phrases from a document in machine readable form. Instructions 40a may be stored in solid state memory 28 or on a floppy disk placed within floppy disk drive 22. Instructions 40a may be realized in any computer language, including LISP and C++.

Instructions 40a differ from instructions 40 in that processor 11 may not necessarily select the same phrases as key phrases as would be selected using instructions 40. Instructions 40a also differ from instructions 40 by permitting processor 11 to select key phrases more quickly. Instructions 40a permit processor 11 to extract the information required from the document in a single pass, rather than requiring two passes as required by instructions 40. Instructions 40a achieve this speed advantage through increased memory use as compared to instructions 40. Despite these differences, instructions 40a closely resemble instructions 40. Because of this resemblance, FIG. 4 illustrates only steps 44a and 45. Instructions 40a include no analog to steps 42 or 46. FIG. 4 does not illustrate steps 48–60 because these steps are essentially identical for both methods of selecting key phrases. Consequently, steps 48–60 need not be described in the following discussion of instructions 40a.

Processor 11 begins execution of instructions 40a with step 44a. During step 44a processor 11 generates a table of candidate phrases by identifying stop words, and acceptable beginning and ending words. During step 44a processor 11 does not consider whether the words included within a candidate phrase are frequent.

Before beginning a discussion of how the table of candidate phrases is built during step 44a consider first the contents of the phrase table. The phrase table includes a phrase count and two representations of each candidate phrase: a generic form representation and a surface form representation. If these representations differ at all, they differ as to capitalization of the words of the candidate phrase. The generic form representation of the candidate phrase is a downcased version of the candidate phrase, which may not occur within the document. Processor 11 uses generic form representations as keys into phrase table by determining the generic form for the candidate phrase and searching for that generic form representation within the phrase table. If processor 11 encounters the generic form representation of a candidate phrase within the phrase table, then that candidate phrase need not be added to the phrase table. Instead, processor 11 increments the phrase count associated with the generic form. The surface form representation represents one of the occurrences of the candidate phrase as actually capitalized. The surface form representation permits processor 11 to present to the computer user each key phrase as actually capitalized at least once within the document. Preferably, the surface form representation always represents the occurrence of the candidate phrase with the fewest capital letters.

Processor 11 represents both the generic and surface forms of candidate phrases as strings of word IDs. Each word ID is an integer number unique to one ASCII representation of a word. Consequently, different capitalizations of the same word will have different word IDs because of the differing ASCII representations. For example, the phrases "hate speech" and "Hate speech" have different ASCII representations and different word IDs. Processor 11 obtains the word IDs from a word ID table. Processor 11 generates the word ID table during step 44a, concurrently with the phrase table. Each time a word is selected for examination during step 44a, processor 11 searches the word ID table for that word's ASCII representation. If the word ID table does not include the word's ASCII representation, processor 11 adds that representation to the word ID table and assigns a unique integer number to function as the word's ID. Processor 11 stores other useful information in the word ID table to speed the generation of the phrase table. Prior to beginning analysis of the document, processor 11 intializes the word table by adding the words from the stop, bad beginning, and bad ending lists to the table and setting the flag or flags associated with that word. Thus, for example, when adding the stop word "the" to the word ID table, the stop word flag associated with "the" will be set. As a consquence of adding the words of these lists to the word ID table, processor 11 need consult only the word ID table to retrieve all information specific to a particular word.

Known hashing techniques can be used to efficiently locate information within the word ID table and the phrase table during the execution of instructions 44a. Consequently, there will be no discussion of how processor 11 retrieves information from these tables while executing instructions 44a.

Figure 5:
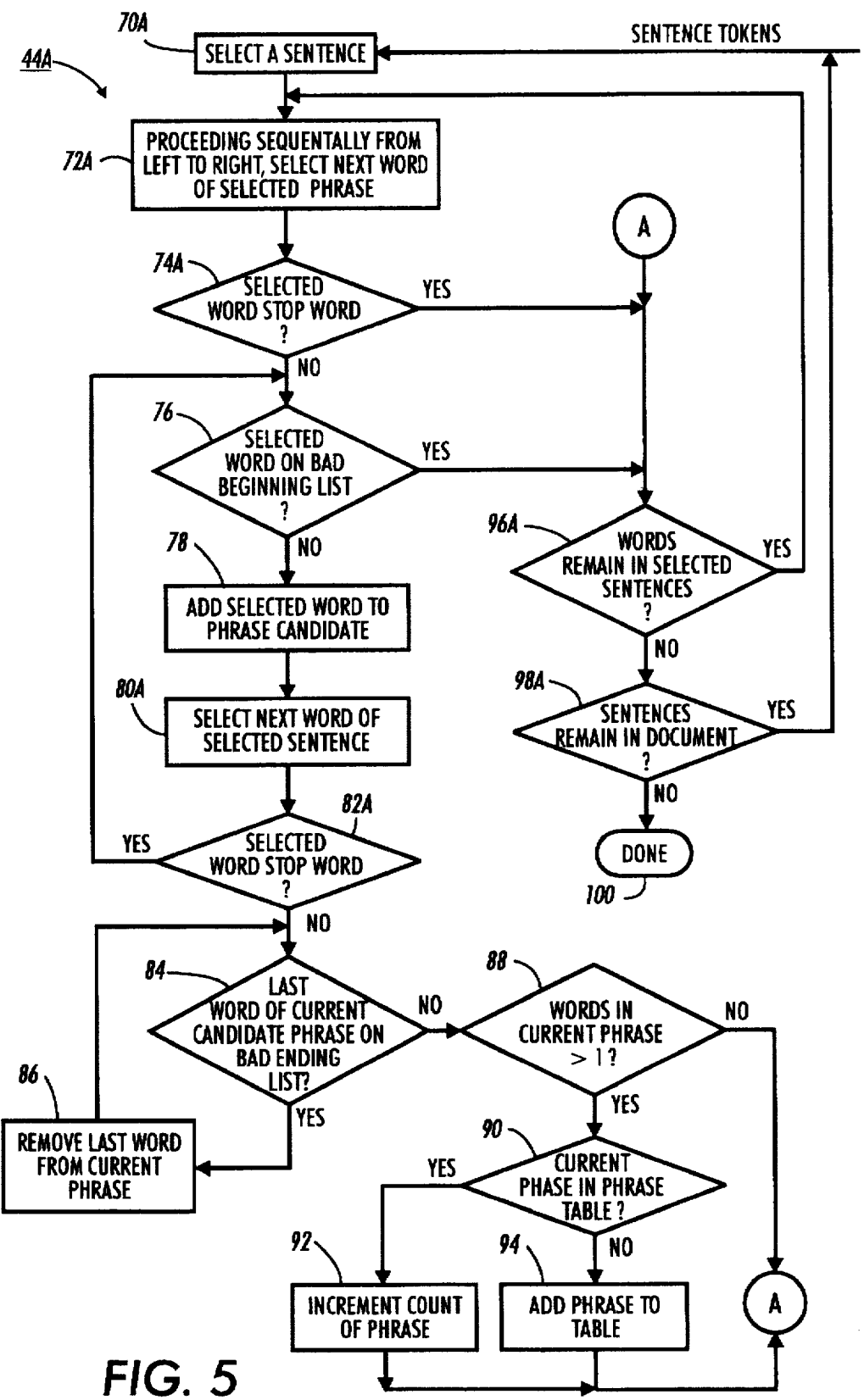
FIG. 5 illustrates in flow diagram form an alternate method of generating candidate phrases.

Equipped with that description of the phrase table and word ID table, consider FIG. 5, which illustrates in detail instructions 44a for generating candidate phrases. Instructions 44a generate candidate phrases in substantially the same manner as discussed previously with respect to instructions 44. Consequently, the following discussion assumes knowledge of that previous discussion and focuses on the differences between the two methods of generating candidate phrases. Differences between instructions 44 and 44a arise because instructions 44a generate candidate phrases from the tokenized document, which includes stop words, without any a priori knowledge of word frequency within the document. As a consequence, instructions 44a search for stop words but not infrequent terms. Not using word frequency to end candidate phrases increases both the average length and the number of candidate phrases, as compared to the candidate phrases generated using instructions 44.

Execution of instructions 44a begins with step 70a. During step 70a processor 11 selects a sentence as a possible source of candidate phrases, rather than a phrase as is the case during step 70. Afterward, during step 72a, processor 11 designates as the selected word one of the words of the selected sentence. From step 72a processor 11 advances to step 74a. During step 74a processor 11 determines whether the selected word is a stop word by consulting the appropriate entry in the word ID table and determining whether the associated stop word flag is set. If so, the selected word is not an acceptable word for a phrase and processor 11 advances to step 96. Execution of steps 96 and 98 proceeds in essentially the same manner discussed previously. On the other hand, if the selected word is not a stop word, then processor 11 branches to step 76.

From step 76 generation of candidate phrases proceeds in substantially the same manner discussed previously with respect to instructions 44 with three minor differences. First, processor 11 consults the word ID table during steps 76, 82a, and 86 to determine whether the selected word is on either of the bad beginning, bad ending, or stop lists, rather than consulting the lists themselves. If processor 11 cannot find the selected word in the word ID table, then during step 76 processor 11 adds an entry for that word to the table. Second, during step 82a, processor 11 excludes words from the current phrase based upon whether they are stop words, rather than their frequency within the document, as is the case during step 82 of FIG. 3.

After generating a candidate phrase, processor 11 advances to step 90, ready to determine how to modify the phrase table. Processor 11 begins this task by generating the generic form and surface form representations of the current candidate phrase using the word ID table, locating the generic form representation of the current candidate phrase in the phrase table. Discovery of the generic form representation in the phrase table indicates that the current candidate phrase is already included within the phrase table. In response, processor proceeds to step 92 to increment the count associated with the candidate phrase. During step 92 processor 11 may also modify the current surface form representation of the candidate phrase if it includes more uppercase words than the surface form of the candidate phrase. Preferably no modification of the surface form representation is made when current phrase includes more uppercase letter than the current surface form representation. On the other hand, if processor 11 cannot locate the generic form representation of the current candidate then processor 11 exits step 90, bound for step 94. During step 94 processor 11 adds both the generic form representation and the surface form representation of the current phrase to the phrase table, as well setting the associated phrase count to one.

After generating all possible candidate phrases during step 44a, processor 11 advances to step 45a, illustrated in FIG. 4. During step 45a selects a subset of the candidate phrases from the phrase table. Processor 11 does so by selecting a subset of the most frequently occurring candidate phrases within the document. The number of phrases selected during step 45a should exceed the number of key phrases to be output, P, but is otherwise a design choice. After executing step 45a, selection of key phrases proceeds as discussed previously.

D. Summary

Thus, a method of selecting multi-word key phrases from a machine readable document has been described. The method begins by breaking the text of the document into multi-word phrases free of stop words that begin and end acceptably. Afterward, the most frequent phrases are selected as key word phrases.

In the foregoing specification, the invention has been described with reference to specific exemplary embodiments thereof. It will, however, be evident that various modifications and changes may be made thereto without departing from the broader spirit and scope of the invention as set forth in the appended claims. Accordingly, the specification and drawings are to be regarded in an illustrative rather than a restrictive sense.

What is claimed is:

1. An automatic method of selecting key phrases from a document presented in machine readable form to a processor, the document including a first multiplicity of words, some of the words forming phrases, the processor implementing the method by executing instructions stored in a memory device coupled to the processor, the method comprising the processor implemented steps of:
   a) generating from the document a multiplicity of phrases not including stop words;
   b) generating candidate phrases from the multiplicity of phrases, candidate phrases including more than one word and being composed of maximally long, non-overlapping subphrases, generating candidate phrases by the substeps of:
      b1) selecting a one of the multiplicity of phrases as a selected phrase;
      b2) selecting as a selected word a yet to be examined word of the selected phrase;
      b3) determining whether the selected word is a frequent word;
      b4) if the selected word is an infrequent:
         A) if all words of the selected phrase have not been examined, repeating steps b2) through b3);
         B) if all word of the selected phrase have been examined, repeating steps b1) through b3);
         C) if the selected word is a frequent word:
            C1) determining whether the selected word is an acceptable beginning for a key phrase by searching a list of bad beginning words;
            C2) if the selected word is not an acceptable beginning for a key phrase:
               i) determining whether all words of the selected phrase have been examined;
               ii) if all words of the selected phrase have not been examined, repeating steps b2) through b3);
               iii) if all words of the selected phrase have been examined, repeating steps b1) through b4);
            C3) if the selected word is an acceptable beginning for a key phrase:
               i) adding the selected word to a current phrase;
               ii) if all words of the selected phrase have not been examined selecting as a selected word a yet to be examined word of the selected phrase;
               iii) determining whether the selected word is a stop word; and
               iv) if the selected word is not a stop word, repeating steps C3i) through C3iii)
   c) selecting as key phrases a subset of most frequently occurring of the candidate phrases.

2. The method of claim 1 wherein step C3) further comprises the steps of:
   v if the selected word is an infrequent word or if all words of the selected phrase have been examined:
      vA determining whether a last word of the current phrase is an acceptable ending for a key phrase by searching a list of bad ending words;
      vB if the last word of the current phrase is not an acceptable ending for a key phrase, removing the last word of the current phrase and repeating step vA);
      if the last word of the current phrase is an acceptable ending for a key phrase, determining whether the current phrase includes more than one word; and
      if the current phrase includes more than one word adding the current phrase to a list of candidate phrases.

3. The method of claim 1 wherein step a) further comprises:
   assigning a unique integer number to represent each word of the document;
   representing each candidate phrase as a string of integer numbers, each integer number of a string representing a word of the candidate phrase; and
   storing each string of integer numbers in a table.

4. The method of claim 3 wherein step a) further comprises:
   storing in a word table the unique integer number associated with each word of the document;
   for each word in the word table storing an indication of whether the word represents an acceptable beginning and an acceptable ending for candidate phrases.

* * * * *